United States Patent Office 2,889,370
Patented June 2, 1959

2,889,370

PRODUCTION OF ALKANOL-BORON FLUORIDE COMPLEX

William H. Schechter, Zelienople, Pa., assignor, by mesne assignments, to Callery Chemical Company, Pittsburgh, Pa., a corporation of Pennsylvania No Drawing. Application May 18, 1955
Serial No. 509,389

4 Claims. (Cl. 260—606.5)

This invention relates to the production of boron trifluoride from trimethyl borate as the starting material.

Boron trifluoride ($BF_3$) is useful for various purposes. For instance, it is a valuable catalyst in a variety of reactions examples of which are alkylation, isomerization and polymerization. It is used also to produce diborane ($B_2H_6$) and other boron hydrides by reaction with, for instance, sodium borohydride ($NaBH_4$) or sodium hydride ($NaH$). For such and other purposes this reagent is commonly used in the form of a complex, or co-ordination compound, with ethers or alcohols, for ease of handling and metering as compared with its use in the simple gaseous state.

The production of boron trifluoride according to the classical and commercial methods is disadvantageous and objectionable from various standpoints such, for example, as relatively low yields based on the starting materials, the necessity for special techniques, and the requirements of special equipment and unusual precautions necessitated by the highly reactive and toxic character of boron trifluoride. It is, accordingly, desired to have simpler and safer methods of producing boron trifluoride in a form in which it is more easily prepared and handled.

It is among the objects of this invention to provide a method of making boron trifluoride that is simple, easily and safely practiced, provides it in the form of non-gaseous complexes that are useful for various purposes to which the fluoride is put, and avoids disadvantages of prior methods of making the compound.

A further object is to provide a simple and effective method of making alcohol-boron fluoride complexes.

Trimethyl borate [$B(OCH_3)_3$] is a compound that may be produced readily and easily from methanol ($CH_3OH$), boric acid ($H_3BO_3$), boric oxide ($B_2O_3$) or borax ($Na_2B_4O_7$). Sodium fluoborate ($NaBF_4$) is a commercially available material.

I have discovered that hydrogen fluoride (HF) and a trialkyl borate will react to produce a boron trifluoride-alcohol complex as exemplified by the reaction

$$3HF + B(OCH_3)_3 \rightarrow BF_3 : 2CH_3OH + CH_3OH$$

Sodium fluoborate will react with a strong mineral acid to liberate $BF_3$ and HF, according to the reaction

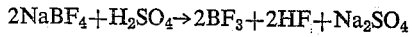

$$2NaBF_4 + H_2SO_4 \rightarrow 2BF_3 + 2HF + Na_2SO_4$$

By utilizing these two reactions it is possible in accordance with this invention to prepare boron trifluoride in a usable form either by reacting HF and an alkyl borate or by reacting a mixture of $NaBF_4$ and an alkyl borate with a strong mineral acid. In each case the reaction product is the di-methanol-boron trifluoride complex.

Although trimethyl borate is preferred for these purposes other lower alkyl borates may be used such, for example, as the ethyl, propyl and butyl borates.

Boron fluoride-di-methanol complex is a strongly acidic liquid boiling at 58° to 59° at 4 mm. This complex may be used for purposes similar to those for which other complexes of boron trifluoride, such as the etherates, are used, i.e., to supply $BF_3$, or it may serve as an intermediate for the preparation of gaseous boron trifluoride or other useful complexes of it.

As an example of the practice of the invention, a mixture of HF and nitrogen ($N_2$) was bubbled into 58 gm. of refluxing $B(OCH_3)_3$. After 30 minutes the solution separated into two phases but after heating for 2.5 hours the lighter phase disappeared completely. The flow of HF was then discontinued and the nitrogen sweep was maintained to free the reaction mixture from any excess HF. Distillation of the mixture yielded the methanol-trimethyl borate azeotrope and 28.4 gm. of $BF_3:2CH_3OH$, representing 39 percent conversion, having physical properties corresponding to those reported by Meerwein and Pannwitz, 141 J. prakt. Chem. 123 (1934). Other ways of carrying out the reaction will occur to those working in the art and may be used, the particular reaction conditions being variable as to temperature and pressure and also as to the particular trialkyl borate.

As further exemplifying the invention, reference is made to the reaction of $NaBF_4$, $B(OCH_3)_3$ and HCl, in which case the presence of methanol is desirable:

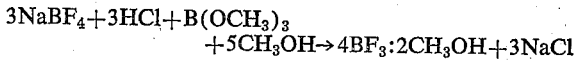

$$3NaBF_4 + 3HCl + B(OCH_3)_3$$
$$+ 5CH_3OH \rightarrow 4BF_3:2CH_3OH + 3NaCl$$

A mixture of 26.4 gm. (0.24 mol) of finely ground $NaBF_4$, 8.32 gm. (0.08 mol) of $B(OCH_3)_3$ and 10 gm. of MeOH was stirred vigorously under reflux in a nitrogen atmosphere while adding 66 gm. of HCl—$CH_3OH$ solution (containing 17.2 gm., 0.47 mol, of HCl). The suspension was refluxed 60 minutes while sweeping volatile products from the flask with nitrogen and collecting them in a series of liquid nitrogen traps. The gas was identified by vapor pressure and molecular weight measurements as methyl chloride ($CH_3Cl$); a yield of 14 percent based on HCl was found. The reaction mixture was extracted thoroughly with $CH_3OH$ and filtered. The solvent was removed and the residue on vacuum distillation gave a yield of 30.9 gm. of $BF_3:2CH_3OH$, a 73.2 percent yield based on the total boron input.

As indicated above, the boron trifluoride-di-methanol complex is adapted for conversion to other useful boron trifluoride complexes that serve for the production of boron trifluoride. A wide variety of complexing agents may be used for such purposes. Thus, the di-methanol complex may be treated with complexing agents that form a more stable complex than alcohol and which may then be decomposed thermally to yield $BF_3$. Examples of such complexing agents are 2,2,2-trichloroethanol and ethylene chlorohydrin.

Again, the di-methanol complex can be converted readily to the ethyl ether complex with liberation of methanol, and the etherate may then be used for its known purposes, for instance, as a catalyst or in the production of boranes or borohydrides from $NaBH_4$ or NaH, or other alkali metal borohydrides or hydrides. As an example of these practices, when 14.8 gm. of dry $(C_2H_5)_2O$ was added to 26.4 gm. of $BF_3:2CH_3OH$ at 25° C. an exothermic reaction occurred. After the reaction subsided the mixture was distilled with recovery first of 10.9 gm. of ether followed by a fuming liquid boiling at 120° to 130° C. at one atmosphere pressure and considered to be $BF_3:CH_3OH:(C_2H_5)_2O$.

Other lower alkyl borates and lower alkyl ethers, e.g., ethyl, propyl and butyl borates and ethers, may be used similarly for the purposes just described.

Still another type of complex that may be produced from the di-methanol-boron fluoride complex is formed by treating it with a polyglycol dialkyl ether. Experience has shown that this cannot be done directly but that the glycol ether complex is formed readily by first converting the di-methanol complex to an intermediate complex, such as a lower alkyl etherate, e.g., $BF_3:(C_2H_5)_2O$. After the etherate has been formed it is treated with the polyglycol polyalkyl ether with displacement of the simple ether by the polyglycol ether, and the displaced alkyl ether may then be removed by distillation. In this way, by forming an intermediate lower dialkyl ether complex, a polyglycol polyalkyl etherate of boron trifluoride can be formed. Other alcohol complexes may similarly be used as the intermediate complex.

As an example of this practice, 26.4 gm. of $BF_3 2CH_3OH$ and 50 ml. of $(C_2H_5)_2O$ were heated at the refluxing temperature of ether, with boron fluoride etherate being recovered by distillation. 28.4 gm. of boron fluoride diethyl etherate and 26.8 gm. of diethylene glycol dimethyl ether were reacted at the boiling point of ether, with recovery of 100 percent of ethyl ether. Conversion of the dialkyl etherate to the polyglycol etherate was thus quantitative.

The di-methanol-boron trifluoride complexes likewise with metallic salts that upon pyrolysis yield gaseous boron trifluoride. Thus, solid complexes may be prepared by treatment of di-methanol-boron trifluoride complex with alkaline earth salts such as lime (CaO), calcium chloride ($CaCl_2$) or calcium fluoride ($CaF_2$).

For example, 13.2 gm. (0.1 mol) of $BF_3:2CH_3OH$ was added to 5.6 gm. (0.05 mol) of anhydrous $CaCl_2$ (4 mesh) and heated at 100° C. for 1.5 hours. Evolution of HCl ceased after one hour, after which 17.9 gm. (0.14 mol) more of the di-methanol-boron trifluoride complex was added. All of the calcium chloride dissolved and more HCl was evolved. Heating was continued for another 1.5 hours. The mixture was then vacuum distilled with recovery of 17.5 gm. of $BF_3:2CH_3OH$, leaving a solid residue which after drying at 200° C. and 2 to 3 mm. pressure weighed 15.6 gm. 3.80 gm. of this solid calcium salt on pyrolysis at dull red heat gave 1.13 gm. of $BF_3$, a yield of 66 percent based on the complex consumed, and 1.30 gm. of white residue and a heavy viscous liquid.

26.4 gm. of di-methanol-boron fluoride complex was added dropwise, with stirring, to 5.61 gm. of finely divided calcium oxide. The initial reaction was strongly exothermic. Distillation of the reaction product yielded a liquid boiling at 70° to 80° C., which gave a positive boron test, and 21.5 gm. of a solid salt that was hygroscopic, gave a positive test for boron, and on dissolving in water showed an acid reaction to litmus. 4.10 gm. of this salt was heated in a Vycor tube at dull red heat for one hour, with evolution of $BF_3$ that was trapped at minus 196° C. and measured in a high vacuum system. The molecular weight determined was 68.3, compared with the calculated value of 67.8. The yield was 32.1 percent based on the complex used.

In another test 13.2 gm. of $BF_3:2CH_3OH$ was added to 3.91 gm. of calcium fluoride, and the mixture was heated for three hours at 100° C. The product was then dried at 70° to 80° C. under a pressure of 1 mm., when it evolved a liquid not containing boron. 10.9 gm. of a hygroscopic solid remained. 2.60 gm. of this solid was heated to dull red heat for one hour with evolution of some liquid and 77 percent of $BF_3$ based on the input of the complex was driven off.

Experience has shown that the yield of $BF_3$ from complexes of $BF_3:2CH_3OH$ with calcium salts may be increased by the use of salts having cations of greater basicity than calcium, specifically salts of barium or strontium. As exemplifying this 8.36 gm. of $BF_3:2CH_3OH$ and 14 gm. of finely ground barium chloride ($BaCl_2$) were mixed and heated at 100° C. The volatile products evolved were collected and fractionated with isolation of 0.015 mol of HCl (11.1 percent based on $BaCl_2$), 0.0127 mol of dimethyl ether (20 percent based on $BF_3:2CH_3OH$)

and a higher boiling fraction of undetermined composition. The residue was heated at 100° to 125° C. at 5 mm. pressure for 30 minutes. A white crystalline solid weighing 16.75 gm. was recovered as a residue. 5.66 gm. of this solid was pyrolyzed under dry nitrogen with evolution of an 82 percent yield of $BF_3$ based on the complex input.

35.1 gm. (0.2 mol) of barium fluoride ($BaF_2$) was stirred in 30 gm. of dry n-butanol while 26.4 gm. of $BF_3:2CH_3OH$ (0.2 mol) was added during an interval of 20 minutes. The reaction was mildly exothermic, the temperature rising to about 40° C. After stirring for two hours the pressure was reduced to 8 to 12 mm. and the mixture heated to 85° C. for six hours. The mixture of alcohols that distilled was trapped at minus 196° C. and from it there was recovered an 85 percent yield of methanol based on the input of the complex. The white solid that remained weighed 50.9 gm. and was identified, by analysis, as a previously unreported double salt $BaF_2:BF_3$, contaminated with a small amount of boron fluoride di-methanol complex. A 3.0 gm. portion of this double salt was pyrolyzed to yield 0.70 gm. of $BF_3$, an over-all yield of 87 percent. When this reaction was repeated using the di-methanol-boron trifluoride complex and barium fluoride in a 1:2 molar ratio the yield of $BF_3$ gas based on $BF_3:2CH_3OH$ was 95 percent.

Another complexing agent is ammonia ($NH_3$). As exemplifying this, excess $NH^3$ was bubbled through 4 ml. of $BF_3:2CH_3OH$ for one hour. An extremely exothermic reaction occurred with formation of a voluminous white solid. Distillation at 100° C. produced methanol of boiling point 64° to 67° C., and excess $NH_3$. The solid produced was $BF_3:NH_3$. When this solid was treated with sulfuric acid saturated with $BF_3$, there was obtained a yield in 3.5 hours of 15.5 percent of $BF_3$. This complex with ammonia is useful also for the production of ammonium fluoborate ($NH_4BF_4$) by heating it.

The conversion of boron fluoride trimethanol complex to other complexes is exemplified by its use for the production of boron fluoride dihydrate ($BF_3 2H_2O$). For example, a solution of 26.4 gm. of $BF_3:2CH_3OH$ in 50 gm. of methanol was stirred and cooled to minus 78° C. The reaction mixture was stored at 28° C. for 16 hours after which it was vacuum distilled to remove the methanol and excess water with production of a crude product boiling at 43° to 44° C. at 2 mm. pressure. This was stirred with another 20 gm. of water for 15 minutes, then purified by distilling twice, resulting in a 97 percent yield of $BF_3:2H_2O$, B.P. 54° C. (4 mm.) that formed a ternary complex with dioxane, $BF_3:2H_2O:C_4H_8O_2$ melting at 141° to 142° C., the melting point reported for the dioxane derivative of boron trifluoride dihydrate (Meerwein and Pannwitz, 141 J. prakt. Chem. 123 (1934).

This dihydrate of boron trifluoride may be used to produce boron trifluoride by reaction with alkaline earth halides and pyrolysis of the resultant complexes. Thus, a suspension of 35.1 gm. of barium fluoride in 30 gm. of n-butanol was stirred and cooled while 20.8 gm. of $BF_3:2H_2O$ was added. The mixture was stirred at 25° C. for 1.5 hours, then it was gradually heated to 70° C. and evacuated to 4 mm. pressure to remove the solvent and the liquid products. The solid product weighed 47.8 gm. and was $BF_3:BaF_2$ containing about 4 gm. of tightly bound boron trifluoride dihydrate. A 3.0 gm. sample of this salt on pyrolysis gave 0.62 gm. of gaseous $BF_3$, a yield of 73 percent. The boron fluoride dihydrate likewise forms a complex with calcium salts, such as calcium chloride, that may be pyrolyzed to produce $BF_3$ although in lower yield than when a barium complex is produced.

Some mineral acids, such as sulfuric, may tend to produce by-products if used in normally available concentrations. Hence it is preferred in such instances to use the acid in dilute condition.

Subject matter disclosed but not claimed herein is disclosed and claimed in copending applications as follows:

Walters et al., Serial No. 526,552, filed August 4, 1955; Walters et al., Serial No. 526,550, filed August 4, 1955, now abandoned; and Giradot et al., Serial No. 526,551, filed August 4, 1955.

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim:

1. That method of providing available $BF_3$ comprising reacting a lower trialkyl borate and hydrogen fluoride in an inert atmosphere and thereby producing a di-lower alkanal boron trifluoride complex, and recovering said di-lower alkanol complex.

2. A method according to claim 1, said hydrogen fluoride being formed in situ by reaction of sodium fluoborate and a strong mineral acid.

3. A method according to claim 2, said borate being trimethyl borate.

4. A method according to claim 1 in which said borate is trimethyl borate.

References Cited in the file of this patent

UNITED STATES PATENTS

| | | |
|---|---|---|
| 2,135,454 | McAlevy | Nov. 1, 1938 |
| 2,446,171 | Croxall | Aug. 3, 1948 |

OTHER REFERENCES

Gmelin's Handbuch der Anorganischen Chemie, Teil 13, Boron, pages 180–182, Verlag Chemie, G.m.b.H., Weinheim, Bergstrasse (1954).

Mellor: "Comprehensive Treatise on Inorganic and Theoretical Chemistry," vol. 5, p. 126 (1924); Longmans, Green & Co., New York, N.Y.